UNITED STATES PATENT OFFICE.

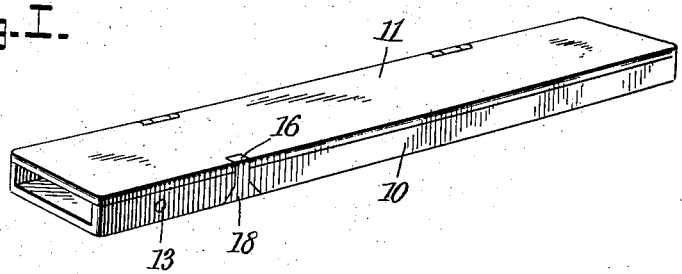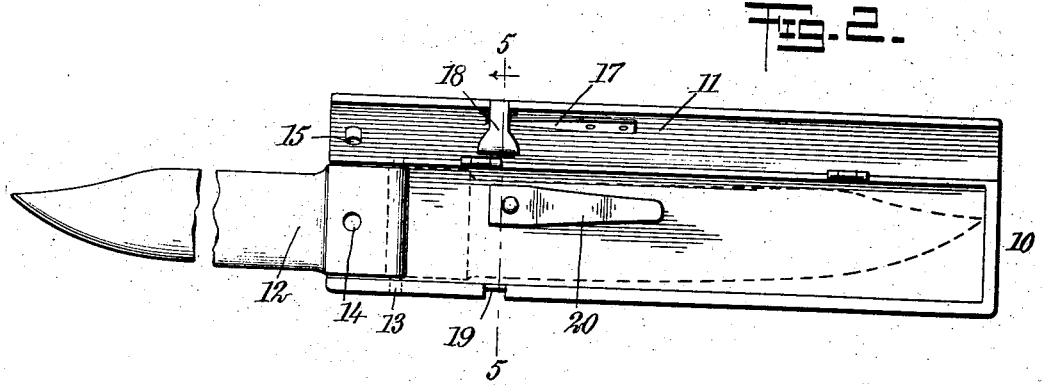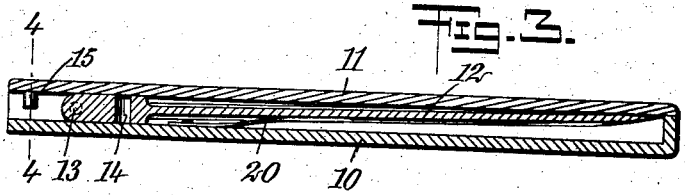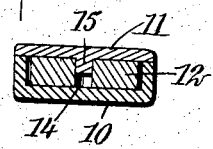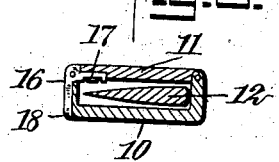

HORACE E. PASTORIUS, OF COLORADO SPRINGS, COLORADO.

TOOL.

No. 895,890.      Specification of Letters Patent.      Patented Aug. 11, 1908.

Application filed January 10, 1908. Serial No. 410,116.

*To all whom it may concern:*

Be it known that I, HORACE E. PASTORIUS, a citizen of the United States, and a resident of Colorado Springs, in the county of El Paso and State of Colorado, have invented a new and Improved Tool, of which the following is a full, clear, and exact description.

This invention is an improvement in tools of the character which are foldable within a handle when not in use, and its object is to provide a tool of this nature which will retain its rigidity with the handle when in operative position after hard and constant usage. To this end I pivot the shank of the tool in the walls of a box-like handle adjacent to one end thereof, and provide the said handle with a hinged lid, which when open, permits the tool to be swung to and from an operative position. In connection with the lid a novel catch is arranged near the shank of the tool where the greatest tendency is experienced to separate the lid from the remainder of the handle when the tool is in use. The handle also carries a spring for automatically opening the lid when the catch is released, and for preventing rattling of the tool when incased in the handle; in addition to a projection for engaging the side of the tool's shank when the tool is extended outside of the handle and the lid closed.

Reference is to be had to the accompanying drawings forming a part of this specification, in which similar characters of reference indicate corresponding parts in all the views.

Figure 1 is a perspective view of my improved tool when the blade is turned within the handle; Fig. 2 is a side view of the tool with the blade extended to the outside of the handle and the lid opened; Fig. 3 is a longitudinal central section of the tool with the blade in the handle; Fig. 4 is a cross-section of the same on the line 4—4 of Fig. 3; and Fig. 5 is a cross-section on the line 5—5 of Fig. 2 when the lid of the handle is closed.

A tool constructed in accordance with my invention essentially consists of a box-like handle 10 open at one end, having a hinged lid 11, and a blade or other instrument 12, the shank of which closely fits and is pivoted within the handle adjacent to the open end thereof by a pivot 13, whereby the blade is adapted to be swung into and out of the handle when the lid is opened. The device 12 also has an aperture or depression 14 in the side of its shank, which registers with a pin or projection 15 carried, on the inner face of the lid 11, when the blade is turned outwardly and the said lid closed. By this construction the shank of the blade is not only supported, when the said blade is in use, by the pivot-pin and the confining walls of the handle, but also from the lid by the aforesaid projection.

Near the shank of the tool where the greatest tendency to separate the lid from the body of the handle is experienced, I provide a catch 16 of bell-crank form, as best shown in Fig. 5, and pivot the same in a notch cut out in the edge of the lid. One arm of this catch is seated in this notch and is pressed to the lid by a flat spring 17, the latter being rigidly secured at one end to the lid at one side of the catch. The opposite and engaging arm of the catch is constructed with a wedge-shaped head 18, as shown in Figs. 1 and 2, with the enlarged portion thereof arranged at the extremity. This head, when the lid is closed, is automatically forced by the spring 17 into a corresponding groove or recess 19 formed within the edge of the body of the handle, and thereby securely locks these parts together. In order that the lid of the handle will be automatically forced open when the catch is disengaged, and that the blade or such other device will be prevented from rattling when incased within the handle, I preferably secure at one end in the bottom of the latter, a flat spring 20, which presses the blade at its free end directly against the lid, as shown in Fig. 3, or, when the blade is turned outwardly, the said spring bears directly on the lid in performing its proper function.

The invention as shown and described, while being the preferred manner of construction of my improved tool, may obviously be modified in particulars without departing from the nature of the same as defined within the scope of the annexed claims.

Having thus described my invention I claim as new and desire to secure by Letters Patent:

1. In a tool of the character described, a box handle having one end thereof open and provided with a hinged lid, a blade having its shank pivoted within and fitting the handle adjacent to said open end, whereby it is adapted to be swung into and out of the handle when the lid is open, and a projection engaging the side of said shank with the handle when the blade is turned out of said handle and the lid closed.

2. In a tool of the character described, a box-like handle having a lid hinged thereto, a blade pivoted within the handle adapted to be turned into and out of the same, and a catch for locking the lid to the body of the handle, comprising a member of bell-crank form having one arm thereof spring-pressed to the lid and the opposite arm provided with an enlarged head adapted to enter a corresponding recess formed in the body portion of the handle.

3. In a tool of the character described, a box-like handle having a hinged lid, a blade having the shank thereof pivoted within the handle and fitting the same, and a catch arranged adjacent to the shank of said blade, comprising a bell-crank pivoted member adapted to lock the lid and body of the handle together.

4. In a tool of the character described, a box-like handle having a lid hinged thereto, a blade having the shank thereof fitting within and pivoted to said handle, whereby it is adapted to be swung into and out of the same, a projection carried by the lid, adapted to enter a recess in the shank of the blade when the said blade is turned outside of the handle and the lid closed, a catch arranged adjacent to the shank for retaining the lid in closed position, and a spring for automatically opening the lid when the catch is released.

In testimony whereof I have signed my name to this specification in the presence of two subscribing witnesses.

HORACE E. PASTORIUS.

Witnesses:
C. SHARPLESS PASTORIUS,
J. M. KEMP.